US005789099A

United States Patent [19]
Kim

[11] Patent Number: 5,789,099
[45] Date of Patent: Aug. 4, 1998

[54] INSULATOR AND PROTECTOR FOR BATTERY TERMINAL

[76] Inventor: Yun S. Kim, 1005 W. Colony La., Hoffman Estates, Ill. 60195

[21] Appl. No.: 805,353

[22] Filed: Feb. 24, 1997

[51] Int. Cl.$^6$ .................................................. H01M 2/00
[52] U.S. Cl. ............................................. 429/65; 429/178
[58] Field of Search ........................... 429/65, 178, 180, 429/181

[56] References Cited

U.S. PATENT DOCUMENTS

| | | | |
|---|---|---|---|
| 3,689,322 | 9/1972 | Linbenberg et al. | 429/65 |
| 3,956,576 | 5/1976 | Jensen et al. | 429/65 |
| 5,021,305 | 6/1991 | Turner | 429/65 |
| 5,626,984 | 5/1997 | Albini | 429/178 |

*Primary Examiner*—John S. Maples
*Attorney, Agent, or Firm*—Michael G. Berkman

[57] ABSTRACT

There is described, for use in conjunction with a battery, a protective device for sleeved securement to cover, insulate, and physically to support exposed terminals of the battery during shipment, storage, and upon ultimate discard for disposal or reclamation. The invention finds special utility in "non-spillable" wet batteries having protruding, physically-exposed terminals or electrodes. The device, which is fabricated of an insulating composition, is formed with an end-wise opening slot into which the exposed and vulnerable end of the battery terminal is sleevedly received. A body section of the device is interposed between the terminal and the bounding outer surface of the battery to provide physical support for the terminal and to prevent objectional bending and distortion. A port formed in the protective device and communicating with the interior of the slot provides convenient access to the battery terminal facilitating the use of a test probe to measure the battery voltage and charge.

5 Claims, 1 Drawing Sheet

INSULATOR AND PROTECTOR FOR BATTERY TERMINAL

FIELD AND BACKGROUND OF THE INVENTION

The present invention relates to a protector for battery terminals. More particularly, the invention is directed to a device sleevedly positioned on a battery terminal to insulate the terminal and to support the terminal against bending, physical distortion and other mechanical damage resulting from the accidental impressing of impaction forces against the terminal.

The present invention finds special utility in "wet" batteries having physically-exposed terminals or electrodes. Typical examples of such batteries are "non-spillable" type lead-acid storage batteries packed with a liquid-absorbing filler such as finely spun glass fibers or "glass wool". Such batteries are used as auxiliary power supplies to provide safety and emergency lighting in hospitals as well as in other critical or sensitive environments. For example, the batteries of the type in which the present invention are useful "take over" and provide emergency electrical power should the usual or line voltage fail due to some incident adversely affecting the primary equipment. Such batteries also serve as "back-ups" for power supplies relied upon to energize and operate computer equipment and other electricity-dependent devices and apparatus of the type uniquely sensitive to and which may suffer serious damage in the event of power failures.

Stand-by, emergency-take-over power supplies or batteries of the broad class herein referred to are ordinarily fabricated to include physically-exposed terminals. These terminals project from or extend beyond the principal body of the battery and terminate in plates to which leads from equipment to be served may conveniently be connected. The battery are connected interiorly of the battery to spatially separated, flange-like webs or leaves. The external terminals of the battery are connected, interiorly of the battery body, to arrays of spatially separated and spaced webs or leaves.

The terminal connector plates are themselves spaced from and generally overlie a top surface of the battery proper. In their physical location and disposition, the exposed terminals are susceptible to be impacted and bent during handling and storing of the batteries, and during shipment and transport. Also, the terminals so exposed may inadvertently be "shorted" to one another should, for example, a foreign object having electrical conductor properties fall upon and bridgedly connect and "short-circuit" the terminals. Such an occurrence could pose a very serious fire hazard, or might cause an explosion.

While simple, tubular slide-on insulating sleeves would be expected to provide protection against shorting of the terminals, they offer no protection of the terminals against being bent out of shape, or damaged or broken.

It is, accordingly, a principal aim of the present invention to obviate the shortcomings and the inadequacies inherent in prior art devices offered to provide protection for exposed terminals of batteries. The present invention provides more effective and more reliable protection for battery terminals against not only electrical shorting, but also against damaging impacts during shipment of the batteries, during battery storage, as well as during ultimate retirement of the batteries for reclamation or final disposition.

SUMMARY OF THE INVENTION

The present invention relates to a protective device for sleeved securement to cover, insulate, to protect, and physically to support exposed terminals of a battery such as a lead-acid storage battery.

A feature of the invention is that the device is operative during shipment of the battery, during storage prior to installation, during extended standby, and upon ultimate retirement of the battery for reclamation or final disposal.

The terminal protector of the invention is characterized by the capability, in its insulating role, of preventing a "shorting" of the electrical terminals, and thus effectively preventing fires as well as possible explosions.

In a preferred embodiment, the device of the invention is fabricated of a plastics composition and is sized so as to be slideably sleeved onto so as frictionally to grip the exposed plate or arm of the battery.

Yet another, related feature of the invention is that the protectors, in place, minimize the hazards of possible fires and explosions when the batteries are ultimately relegated to reclamation, to scrap, or are otherwise disposed of.

The protective devices of the invention also operate effectively during the loading and unloading of batteries so fitted, as well as during shipment and during transport on pallets, or otherwise, not only to prevent electrical shorting with its potentially very serious consequences, but also to support the terminals should they be mechanically impacted.

More specifically, it is a useful feature of the sleevedly-mounted and secured protective device of the invention that it includes an integrally-formed, base-like under support for the projecting arm of the terminal, the supporting base component serving to prevent impinging impacts of foreign objects on the projecting arm of the terminal from bending the electrode out of shape or otherwise damaging it.

Yet another important feature of the invention is that the device is formed with an end-opening slot which is dimensioned and shaped so that its interior walls snugly envelope and embrace the projecting, plate-like end or arm of the battery terminal to be protected.

A related feature of the invention is that the protective device is sized so as to establish frictional forces operating between the terminal and the sleeved protector, firmly and positively to secure the device in place without any need for auxiliary clamps or similar aids or accessories.

Still another important feature of the sleevedly-adhered protective, terminal-enveloping cover for the battery terminals is the provision, in the device, of an opening or access port formed in the protective cover. It is through this opening that a sensing probe or meter lead may be inserted to contact the battery electrode itself. In this way, testing of the battery charge, or other parameter, may be simply and conveniently carried out, without any need to remove the protector from the terminal.

In a preferred embodiment of the invention, access of the probe to contact the terminal is through an opening in a terminal-surmounting top wall component of the protective slide-on sleeve.

In the embodiment of the invention illustrated, access of a probe to the electrode or terminal is effected through an end-opening passage or slot formed in a top wall of the protective, slide-on device.

In the preferred embodiment of the invention, and as shown in the drawings, the terminal-insulating protective device takes the form of a molded block-like body formed at an upper zone thereof with an endwise-opening, horizontal slot into which a projecting plate-like end or arm of the battery electrode is sleevedly received.

A related feature of the invention is that a base portion of the block is sized and orientated so as fully to occupy or fill the space between the slot and an outer top surface of the battery itself, thus serving as a positive mechanical support for the projecting plate of the electrode.

Conveniently, the device is molded of a polypropylene or other plastics composition characterized by a high degree of chemical inertness and resistance to damage from mechanical impact.

Other and further features and advantages of the invention will be evident from the following detailed description considered in conjunction with the drawings.

DETAILED DESCRIPTION OF ILLUSTRATED EMBODIMENT

In accordance with the present invention, the aims and objects are achieved by providing, for use in conjunction with storage-type batteries of the configuration having projecting electrodes or terminals, an overlying, sleevedly-secured protective device for shielding the electrode to prevent accidental electrical shorting of the terminals. The device serves also to support the terminals and to prevent damaging bending and distortion or breaking thereof, as could otherwise result from impacting physical forces impressed thereupon during packaging, shipment, storage or ultimate disposition of the battery when its useful life has come to an end.

In a preferred embodiment of the invention, the sleevedly-positioned protective device is frictionally secured in place and is formed with an access port or opening through which the sensing probe of a voltage meter or equivalent device may be projected to make electrical contact with the terminal so as to measure relevant operational parameters such as the voltage and degree of charge of the battery.

Typical of the batteries in which the present invention finds utility are "non-spillable" wet batteries of the acid-filled type. Conveniently, the terminal protector of the invention is fabricated in an injection molding process.

Figure 1:
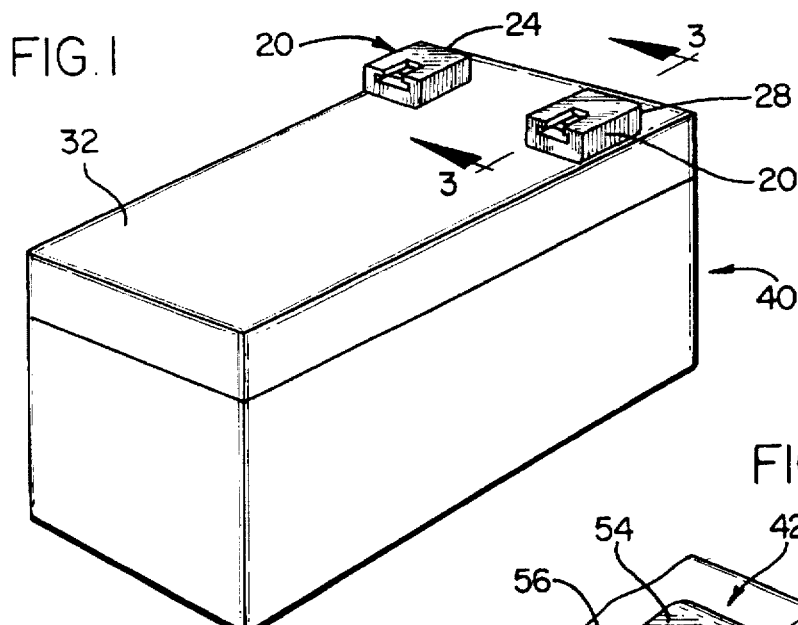
FIG. 1 is a perspective view of a battery of the type in which the terminal protector of the invention finds utility, and with the protective device of the invention sleevedly positioned in place.
Figure 2:
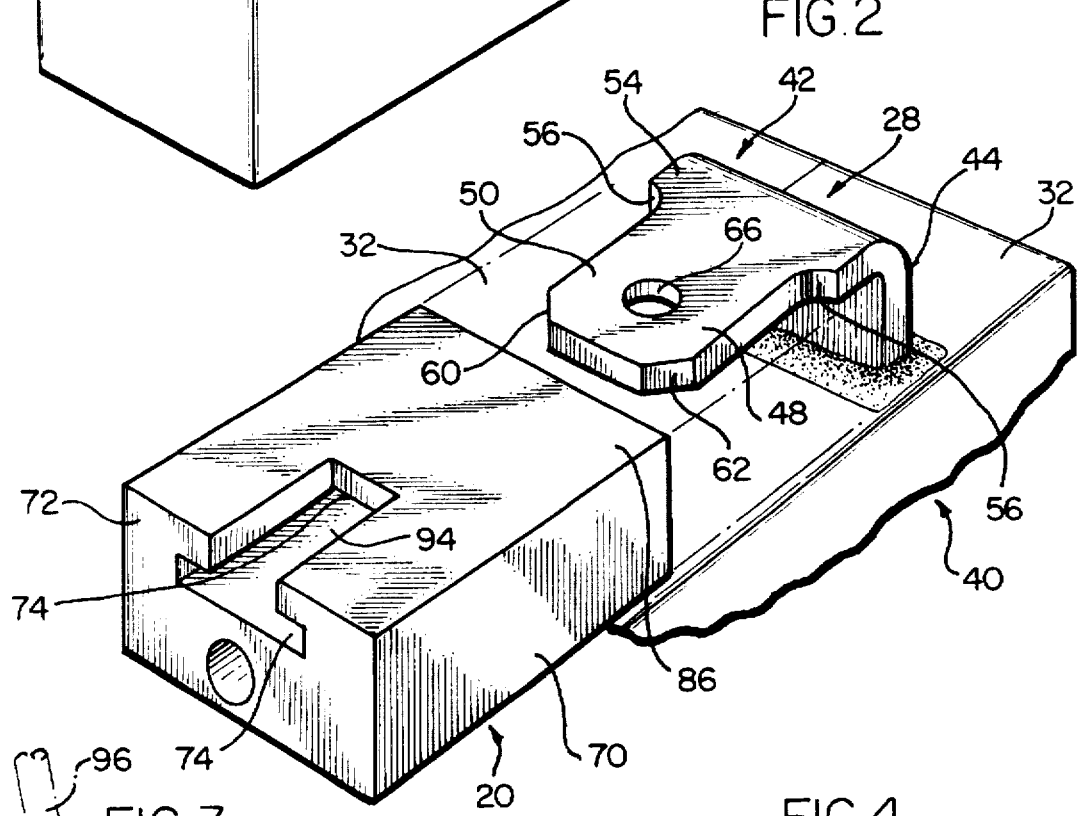
FIG. 2 is an enlarged, fragmentary view of a single battery terminal and indicating, schematically, the protector of the invention lineally oriented for functional positioning in place over the projecting end of the terminal.

Referring now to the drawings, and more particularly to FIGS. 1 and 2, for purposes of disclosure and not in any limiting sense, a preferred embodiment of the terminal protector 20 of the invention is depicted. As shown in FIG. 1, the device 20 is secured in place on each of a pair of battery terminals including a positive terminal 24 and a negative terminal 28 surmounting and extending upwardly of a top wall 32 of a battery 40.

The precise physical configuration of the terminal 42 on which the protective device 20 is mounted or secured (FIG. 2), is not critical. A terminal 42 of the type found in batteries of the class involved is shown in FIG. 2 as including an upwardly-extending wall-like leg 44 generally normal to the top wall 32 of the battery 40 and connected at its lower terminus (not shown) to an array of spaced webs or leaves (not shown) in the body of the battery 40, in a manner well known in the art.

The internal construction and structure of the batteries of the type herein involved are well known in the art. Accordingly, no detailed description is deemed to be necessary in the instant presentation.

The terminal 42 is integrally formed at an upper limit of the upwardly-projecting leg 44 with a horizontal arm or plate 48 which extends rearwardly of and generally normally of the leg 44 of the terminal 42, as best seen in FIG. 2. In the embodiment of the invention illustrated, the lateral dimension of the plate is, in its major extended lineal expanse 50, somewhat narrower than at its zone 54 of joinder or junction with the leg or upstanding wall 44 of the terminal 28 (FIG. 2), thus providing abutments or shoulders 56. Also, the free, outwardly-directed corners of the plate 50 are shown as cut away 69 and 62, and a transverse hole or bore 66 is shown as formed in the plate 50 in a generally central a real zone thereof. The details represent conventional features of terminals of the type found in the general class of batteries here involved, and are for the purpose of facilitating the ready attachment of "FASTON" type taps or clips (not shown) to the terminals, as is also well known in the art.

Figure 3:
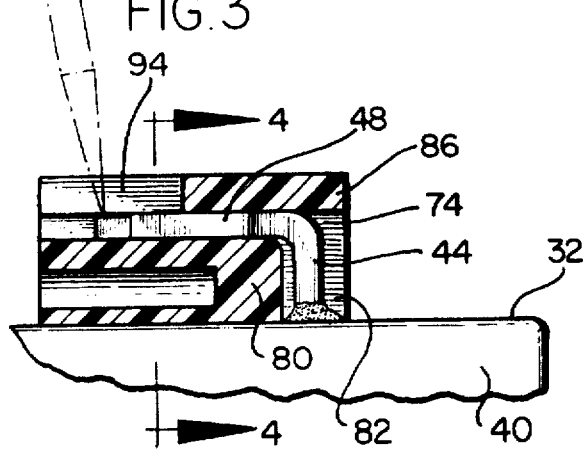
FIG. 3 is a cross-sectional view taken substantially on the lines 3—3 of FIG. 1 and showing the terminal protector in place on the battery terminal, and indicating the manner in which a probe may be employed in measuring the voltage and charge of the battery.
Figure 4:
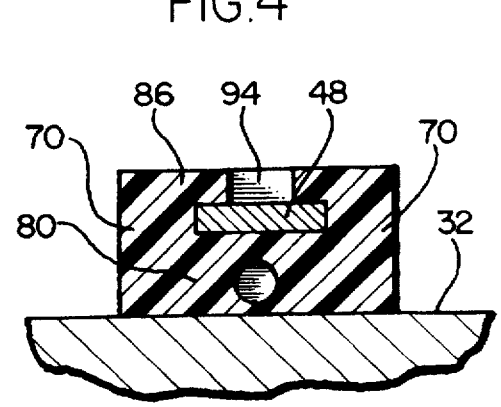
FIG. 4 is a cross-sectional view taken substantially on the lines 4—4 of FIG. 3 and showing the protector sleeved onto and supporting the battery terminal on the underlying top surface of the battery, to prevent downward bending distortion of the electrode.

Having provided a general description of the physical system in which the terminal protector 20 of the invention finds utility, and having also described an electrode of the general class or type involved, attention is now directed to the structure of a preferred embodiment of the terminal proctor 20 itself, with specific reference to FIGS. 2, 3 and 4.

As shown in FIG. 2, the terminal protector 20 comprises a block-like body 70 of a plastics or similar electrically non-conductive composition. The body 70 is formed, at an upper zone 72 thereof, with a generally-horizontal slot 74 opening endwise of the block-like body 70 and disposed in the upper zone 72 of the body 70 for slideably receiving therewithin the horizontally-extending arm or plate 48 of the battery terminal 28.

As shown in FIG. 4, the body 70 of the terminal protector 20 includes below the slot 74, a base 80 defining a vertical stabilizer and structural mechanical support for the sleevedly-encased plate 48 of terminal 28. In the preferred embodiment of the invention illustrated, the base 80 is partially cut away to define an end recess 82 allowing full entry of the plate 48 into the slot 74 to ensure that a top wall 86 of the body 70 of the device 20 covers completely the extending arm or plate 48 of the terminal 28, as shown in FIG. 3. At the same time the vertical component or leg 44 is more effectively shielded from undesirable contact with foreign objects. The goal of protecting the battery electrode 42 from being inadvertently shorted is realized.

As shown in FIGS. 3 and 4, the base component 80 of the block-like body 70 of the device 20 of the invention extends from the battery top wall 32, on which it rests, to abut an undersurface 90 of the horizontally-projecting plate 48 of the terminal 42. In the configuration described and effected, the base 80 of the device of the invention defines a positive, unfailing support for the outwardly-projecting or extending plate 48 of the terminal 28. Physical deformation, distortion and/or collapse of the plate 48 are effectively prevented. Another important aim of the invention is realized.

As best seen in FIGS. 2, 3 and 4, the terminal protector and supporter 20, in a top wall 86 thereof, is formed with a cut-away sector 94. This sector or opening 94 communicates with the slot 74 into which the plate 48 of the terminal 42 is sleevedly received. As indicated schematically in FIG. 3, the cut-away 94 finds important utility as a convenient means for accessing the terminal 28 with a probe 96 or electrical instrument lead by which the voltage or other parameters of the battery may be measured and followed.

What is claimed is:

1. A unitary, integrally-formed insulating cover and protector device for attachment to a battery terminal, the terminal constituting an electrode functionally secured in and projecting outwardly of a bounding surface of the battery, and the terminal of the battery being integrally formed with a laterally-extending, leg-supported conductive plate, said insulating cover and protector device comprising a body composed of a non-metallic, electrically non-conductive, chemically-inert composition, said body of said device being formed with slot means opening end-wise of said body, for sleevedly-receiving therewithin, in contiguously mating engagement therewith, the leg-supported, laterally-extending plate of the battery electrode, the plate of the battery terminal being displaced upwardly of and paralleling the bounding surface of the battery, said body of said protective device including base means for supporting the laterally-extending plate of the battery terminal against disruptive mechanical forces impinging thereagainst and tending physically to distort and to bend the plate of the battery terminal toward the body of the battery, said base means being disposed below said slot means and having an upper surface defining a lower boundary of said slot means, and said base means having a lower surface defining a lower limit of said body of said device, and being operative to abut and to bear upon a facing, bounding surface of the battery presented thereagainst.

2. A device as set forth in claim 1 and further comprising port means formed in said body in an upper sector thereof for communicating with said slot means and for providing physical access to said slot means for facilitating the taking of voltage measurements at the battery upon directing a probe of a meter to invade said body of said device and to make electrical contact with the battery terminal protected by said device.

3. A device as set forth in claim 1 wherein said body is formed at a base thereof with cut-away means in a zone below the opening of said slot means and communicating therewith for accommodating an upwardly-extending support leg constituting an integral component of the battery terminal.

4. A device as set forth in claim 2 wherein said port means is directed downwardly from a top surface of said body for intersecting said slot means to facilitating accessing of a sensing probe to engage the battery terminal for determining the voltage at the terminal.

5. The invention as set forth in claim 1 wherein said device is composed of a plastics composition.

* * * * *